Aug. 26, 1969    R. M. LOCKWOOD ET AL    3,462,955
PULSE JET ENGINE
Filed June 29, 1967
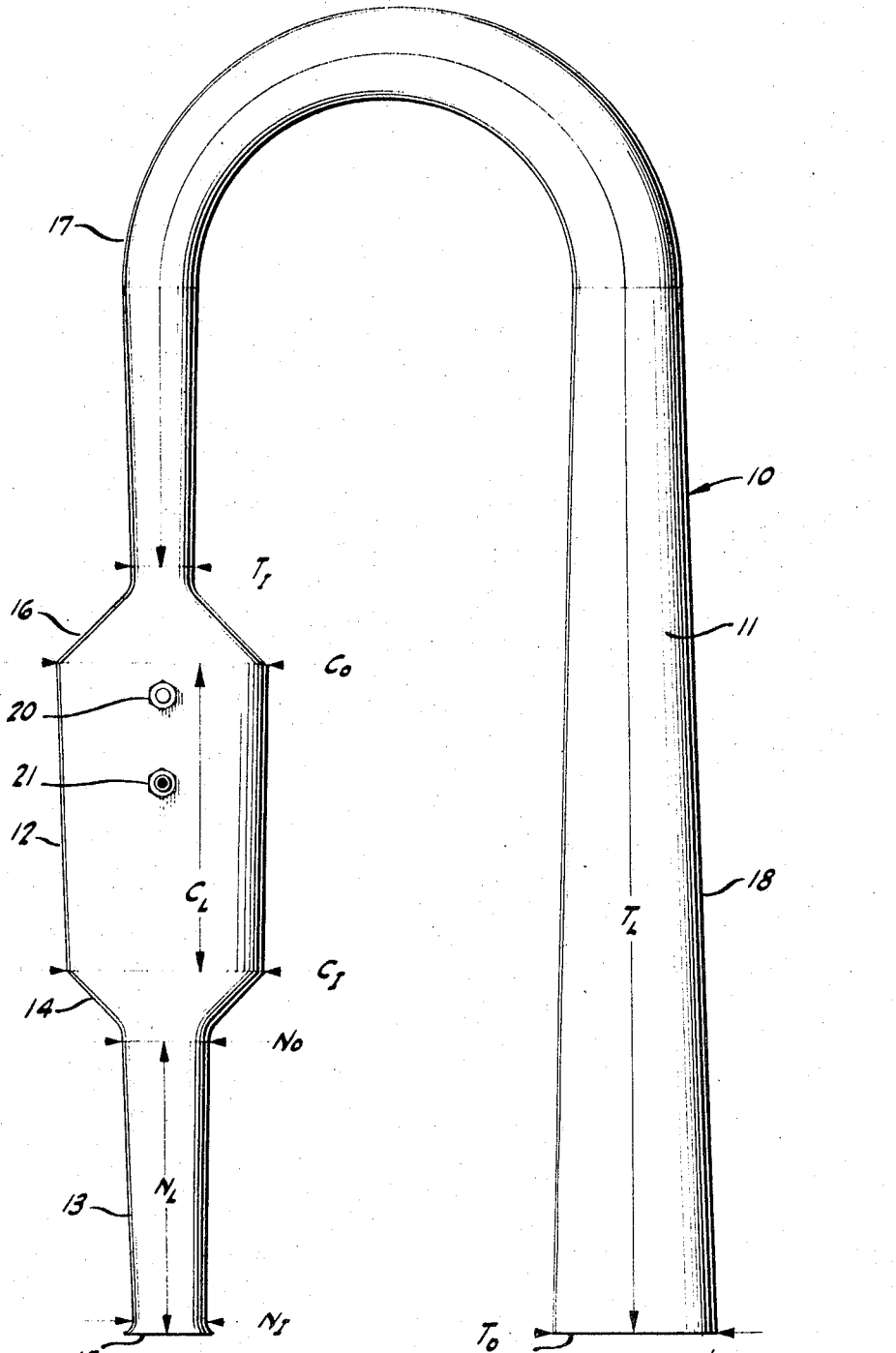
INVENTORS
RAYMOND M. LOCKWOOD
EDWARD L. BENNETT
DAVID A. GRABER
BY Stanley Bialos
ATTORNEY

United States Patent Office

3,462,955
Patented Aug. 26, 1969

3,462,955
PULSE JET ENGINE
Raymond M. Lockwood and Edward L. Bennett, Los Altos, Calif., and David A. Graber, Menlo Park, Calif., assignors to Fairchild Hiller Corporation, Hagerstown, Md., a corporation of Delaware
Filed June 29, 1967, Ser. No. 649,876
Int. Cl. F02k 7/02; F02c 5/00
U.S. Cl. 60—249                7 Claims

ABSTRACT OF THE DISCLOSURE

A valveless pulse jet engine comprised of a hollow U-shaped tube having open ends respectively defining inlet and exhaust openings, and being provided with a combustion chamber located intermediate such ends. The engine along its entire length is of non-cylindrical sections, and its performance characteristics are enhanced because of such non-cylindrical configuration.

---

This invention relates to a pulse jet engine and, more particularly, to a valveless pulse jet engine having a hollow, U-shaped combustor of non-uniform cross section from end to end thereof.

As explained in Lockwood Patent No. 3,206,926, a pulse jet engine is a relatively simple structure essentially comprising an elongated hollow tube open at its ends and turned upon itself into a generally U-shaped configuration with the open ends thereof facing in the same direction. Such tube is sometimes referred to as a combustor, and intermediate the ends thereof, fluid fuel is introduced into the engine through a nozzle structure located at a section of the tube generally referred to as the combustion chamber. A sparking device is also located at such combustion chamber, and in operation of the engine, both fuel and air, the latter in sufficient volume to create a combustible mixture with the fuel, enter the combustion chamber and the sparking device is energized to ignite the mixture. Upon ignition of the mixture, the consequent expansion of the gases within the combustion chamber results in a gaseous discharge through the open ends of the engine producing thrust forces tending to propel the engine in a direction opposite to the direction of flow of the gaseous discharge.

Ignition of the fuel within the combustion chamber is accompanied by a rapidly increasing gaseous pressure therein which rises to a value tending to interrupt fuel expression from the nozzle. As the combustion gases expand outwardly from the combustion chamber for discharge through the open ends of the engine, the pressure within the combustion chamber progressively decreases until a value is reached at which a charge of fuel sprays from the nozzle and a reverse flow of the gases toward the combustion chamber is initiated. Such reversal of flow direction results in ambient air being drawn into the combustion chamber for admixture with the fuel charge therein. The combustible mixture of fuel and air is then ignited and the cycle of operation is repeated. The sparking device can be de-energized once the engine commences to run because ignition of the combustible fuel and air mixture is caused by the temperatures attained in the combustion chamber.

The discharge of fuel from the nozzle structure and into the combustion chamber is intermittent as a consequence of the cyclic change in pressure therein from a low value corresponding to the final phases of gaseous expansion during the combustion cycle to a high value corresponding to the initial phases of gaseous expansion following ignition of the combustible mixture; and the pressure at which fuel is supplied to the nozzle is selected to have a value so related to such gaseous pressures that discharge of fuel into the combustion chamber is terminated by the higher pressures therein and is permitted at the lower pressures which reduce to values less than atmospheric. Evidently then, the engine operates intermittently at a cyclic repetition rate that can vary over wide ranges and is essentially proportional to the overall length of the engine. By way of example, a typical cyclic frequency may come within the range of from about 30 cycles per second for relatively long engines to about 200 cycles per second, or more, for shorter engines—i.e., 2½ to 3 feet in length.

So far as is known, pulse jet engines of the prior art have been of substantially uniform cross section throughout most of the length thereof with the exception of the inlet and exhaust nozzle sections which are usually tapered. It has been discovered that a pulse jet engine which is entirely of non-uniform cross section from one end to the other end thereof is superior in a significant number of respects to engines of uniform cross section. Among such superiorities are easier engine starting, greater permissible range of variation in the rate of fuel delivery accommodated by the engine, and higher ratio of thrust and air-handling capacity of the engine per unit volume thereof. It is, accordingly, an object, among others, of this invention to provide an improved pulse jet engine having such non-uniform cross-section configuration and having also such features of superiority; and as respects additional objects and advantages, especially of a particular character, many will become readily apparent as the specification develops.

An embodiment of the invention is illustrated in the accompanying drawing in which the single figure thereof is a side view in elevation of a pulse jet engine.

The valveless pulse jet engine illustrated in the drawing in its entirety with the numeral 10, and includes a combustor 11 in the form of an elongated hollow tube bent upon itself to form the generally U-shaped configuration illustrated in which the open ends of the tube face in the same direction. The combustor 11 comprises therealong a combustion chamber 12 connected at one of its ends to an inlet nozzle section 13 through a transition section 14. The nozzle section 13 forms one end portion of the combustor 11 and terminates in an inlet opening 15. The combustion chamber 12 at its other end is connected through a transition section 16 and generally arcuate coupling section 17 to a tail pipe 18 terminating in an exhaust opening 19.

The engine 10 is equipped with a sparking device 20 and at least one fuel nozzle structure 21, and each such component is affixed to the engine at the combustion chamber 12 thereof and extends into the chamber. As respects the present invention, the sparking device 20 may be completely conventional and in the usual case is an electric spark plug. The nozzle 21 may be of the type disclosed in assignee's copending patent application of Raymond M. Lockwood and David A. Graber, Ser. No. 649,879, filed June 29, 1967, although as concerns the particular invention being considered herein, any fuel nozzle may be employed.

As indicated hereinbefore, fuel in either liquid or gaseous form is delivered to the interior of the combustion chamber 12 via the fuel nozzle structure 21, and the engine is first started by energizing the sparking device 20 to ignite the admixture of fuel and air within the combustion chamber. However, once operation of the engine is initiated, the sparking device 20 can be de-energized because the engine will continue to operate so long as fuel is supplied thereto as a result of the high temperatures attained by the combustion chamber. Operation of the engine constitutes cyclically repetitive ignition of the fuel charges intermittently introduced into the combustion chamber 12 through the nozzle 21 and following each such ignition of the combustible mixture, the resultant gaseous expansion within the combustion chamber causes the discharge of gases outwardly through the inlet opening 15 and through the exhaust opening 19, which discharge produces thrust tending to displace the engine 10 in a direction opposite that to the direction of flow of the discharging gases. In a typical engine, the ratio of the gaseous discharge from the exhaust opening 19 to the gaseous discharge from the inlet opening 15 is about 60 to 40.

Following such outward discharge of gases through the openings 15 and 19, a reverse or inward flow commences which is due at least in part to the reduced pressure then present within the engine and particularly within the combustion chamber 12 thereof. Such reversal of flow direction induces an inflow of ambient air through the opening 15 and nozzle section 13 into the combustion chamber 12 to provide air for mixture with the fuel charge then entering the combustion chamber through the nozzle 21; and such inflow of air is attendant by considerable turbulence within the combustion chamber which produces an advantageous mixing of the air with the fuel. Such reversal of flow direction also induces an inward flow of ambient air through the exhaust opening 19 toward the combustion chamber 21. However, it has been determined that very little, if any, ambient air flowing through the tail pipe 18 toward the combustion chamber 12 actually reaches the same before the next successive ignition cycle commences, whereupon the direction of flow is reversed. Nevertheless, such inflow of air through the opening 19 tends to pack air into the tail pipe section of the engine resulting in a greater volumetric discharge (and thrust in a greater development) than would otherwise be the case. As indicated hereinbefore, this cyclically repetitive operation of the engine continues until the supply of fuel thereto is terminated and, as previously stated, a typical frequency for an engine of this type may be in the range of from about 30 to over 200 cycles per second.

As stated heretofore, the engine 10 throughout its entire length is of non-uniform cross-sectional area, and in the specific form shown, continuously changes in area all along the length thereof. Thus, and considering the tail pipe 18 and arcuate coupling 17 to be an integer, the combinative structure defining such integer incrementally changes in cross-sectional area continuously from the pipe outlet $T_O$ adjacent the exhaust opening 19 to the tail pipe inlet $T_I$ adjacent the transition section 16 and, evidently, the larger cross-sectional area occurs adjacent the exhaust opening 19. In a similar manner, the nozzle 13 incrementally and continuously increases in cross-sectional area from the nozzle inlet $N_I$ adjacent the inlet opening 15 to the nozzle outlet $N_O$ adjacent the transition section 14; and in considering the precise location of opening $N_I$, the smallest cross-sectional area is taken rather than the area of the outwardly flared lip, the curvature of which is a lemniscate.

In the case of the combustion chamber 12, it incrementally and continuously changes in cross-sectional area from a larger combustion chamber outlet $C_O$ adjacent the transition section 16 to a smaller combustion chamber inlet $C_I$ adjacent the transition section 14. Each of the transition sections 14 and 16 incrementally and continuously changes in cross-sectional area, and in each instance the larger area of the transition section is adjacent the combustion chamber 12.

In substantially every case the engine 10 will have a circular cross section at any traverse plane cut therethrough normal to the engine center line thereat, and the reason for preference of such a cross-sectional configuration is that it minimizes flow-energy losses and thereby provides the most advantageous flow characteristics for the movement of fluid along the combustor. Accordingly, in establishing various ratios and relationships involving dimensions along the engine, it is convenient to refer to such dimensions in linear units defining legths and diameters. Thus, if the sizes of the aforementioned openings $N_I$ and $N_O$, $C_I$ and $C_O$, and $T_I$ and $T_O$ are expressed in diameters rather than circular areas, then dimensionless ratios can be established directly with various combustor-section lengths; and in this respect, the length of the nozzle 13 between the openings $N_O$ and $N_I$ is taken to be $N_L$, the length of the combustion chamber between the openings $C_O$ and $C_I$ is taken to be $C_L$, and the length of the tail pipe between the openings $T_I$ and $T_O$ is taken to be $T_L$.

As explained heretofore, the combustor is of non-uniform cross section from end to end thereof and in considering the size of the opening in any particular combustor section the mean opening size thereof is advantageously used. Accordingly, the mean opening size $N_M$ is taken for the nozzle section 13, and the mean opening sizes $C_M$ and $T_M$ are used with reference to the combustion chamber 12 and tail pipe 18. The following relationships based on all of the foregoing dimensions have been found to be exceedingly important:

$$N_L/N_M, \; C_L/C_M \text{ and } T_L/T_M$$

and in numerical terms it has been found that the ratio $N_L/N_M$, should be in the range of about 3.50 to 4.25, the ratio $C_L/C_M$ should be in the range of about 1.25 to 1.75, and the ratio $T_L/T_M$ should be in the range of about 26.0 to 29.0.

Considering a specific example of a valveless pulse jet engine of circular cross section at any plane taken thereacross and of non-uniform cross section therealong (wherefore each section of the combustor is frustoconical and the mean diameter thereof is located at a position therealong one third of its length as measured from the largest opening), the following lengths and diameters appear:

$N_L=6$ inches, $C_L=6$ inches, and $T_L=40.6$ inches;
$N_I=1.5$ inches, $N_O=1.625$ inches, wherefore $N_M=1.56$ inches;
$C_I=4.0$ inches, $C_O=4.25$ inches, wherefore $C_M=4.125$ inches;
$T_I=1.13$ inches, $T_O=1.75$ inches, wherefore $T_M=1.43$ inches.

Accordingly, the following relationships are presented:

$$N_L/N_M=3.85, \; C_L/C_M=1.455, \; T_L/T_M=27.4$$

In the same engine, the transition sections 14 and 16 have half angles of 45° and the ratios of the openings thereof are:

$$C_I/N_O=2.46, \text{ and } C_O T_I=3.66$$

As concerns the transition sections 14 and 16, it will be noted that the respective lines of mergence thereof with the combustion chamber 12 is at a relatively sharp obtuse angle and, in a similar manner, the respective lines of mergence of the transition sections with the nozzle 13 and tail pipe 18 are also quite sharply defined. These sharp-line definitions are advantageous in that they tend to introduce considerable turbulence into the air flowing inwardly through the nozzle section 13 and tail pipe 18 and into the combustion chamber 12, which turbulence facilitates admixture of the air with the fuel being delivered to the combustion chamber through the nozzle 21.

It has been found that the non-uniformity in cross-sectional area of the combustor avoids structural assignment of a natural resonant frequency to the combustor which is an exceedingly advantageous avoidance in that it obviates any requirement for matching of the various sections of the combustor one with the others. In this respect, combustors of uniform cross-sectional area have been found to have a natural frequency of resonance and, therefore, require careful matching as between the various sections of a combustor. This feature is of significance in an engine of the type being considered which is not artificially timed—it being recalled that the sparking device 20 is de-energized shortly after the engine has been started.

The non-uniformity in cross-sectional area, especially of the inlet nozzle section 13, permits use of a tail pipe 18 of much shorter length than otherwise would be the case. Further as concerns size, the volumetric capacity of the combustion chamber 12 will depend to a considerable extent on whether the fuel being employed is a gaseous or liquid fluid; and where a gaseous fluid is employed, the volumetric capacity of the combustion chamber is usually larger than where liquid fuel is used because a larger volume of gaseous fuel is required to provide the same heating capacity as a much smaller volume of liquid fuel. It may be noted that methane gas is one of the gaseous fluids which can be used as a fuel in the present engine, and the ability to burn fuel of this type is advantageous because it is an inexpensive fuel and readily available.

In a specific comparison of two pulse jet engines comparable in every respect except that one is of the improved type having a non-cylindrical configuration from end to end thereof in accordance with the explanations set forth herein, it has been established that the improved engine has significantly better starting characteristics, the lean-out to rich-out fuel mixture range was materially extended, and thrust development thereof was also increased. As concerns thrust development, an increase in the order of 2 to 1 in the ratio of thrust per unit volume of the engine was experienced. Further, the improved engine was markedly more resistant to flame-out and, therefore, was much more stable in its operation.

As indicated hereinbefore, an engine constructed in accordance with the present invention can be used in a number of environments, and in this respect can be employed to provide lift and propulsion for vehicles of various type, the discharge from the engine can be used to develop the supporting air for an air cushion vehicle, and the engine is also useful as a heater or heater-blower because of the high rate of heat transfer due to the pulsating or unsteady discharge from the engine.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a valve-less pulse jet engine, a combustor comprising an elongated hollow tube having a frusto-conical inlet nozzle with an inlet opening at one end and a larger outlet opening at its opposite end, a first frusto-conical transition section having an opening at its narrow end of the same area as said outlet opening of said inlet nozzle in communication therewith and having a larger opening at its opposite end, a frusto-conical combustion chamber having an inlet opening at its narrow end of the same area as and communicating with the larger opening of said first transition section and having a larger outlet opening at its opposite wide end, a second frusto-conical transition section having an opening at its wide end of the same area as and communicating with said combustion chamber outlet opening and having an outlet opening at its narrow end, a tail pipe having an inlet opening of the same area as and communicating with the outlet opening at the narrow end of said second transition section, the tail pipe tapering outwardly from its inlet opening to a larger exhaust opening; said combustor being entirely of circular transverse cross-section increasing incrementally and continuously in cross-sectional area along said inlet nozzle to said first transition section, along said first transition section to said combustion chamber, along said combustion chamber to said second transition section, and along said tail pipe from its inlet opening to its exhaust opening, but decreasing incrementally and continuously in cross-sectional area along said second transition section from said combustion chamber to said tail pipe inlet opening.

2. In a valve less pulse jet engine, a combustor comprising an elongated hollow tube having at one end portion a frusto-conical inlet nozzle terminating at one end in an inlet opening and tapering outwardly from said inlet opening to an outlet opening and also having at the opposite end portion a frusto-conical tail pipe terminating in an exhaust opening and tapering inwardly from said exhaust opening toward an inlet opening; said tube being provided intermediate its ends with a frusto-conical combustion chamber and a pair of frusto-conical transition sections respectively connecting said inlet nozzle and said tail pipe to said combustion chamber; said combustion chamber having an inlet opening at one end communicating with one of said transition sections and an outlet opening at its opposite end of larger cross-sectional area than its inlet opening communicating with the other transition section, and being entirely of circular transverse cross-section increasing incrementally and continuously in cross-sectional area from its inlet opening to its outlet opening.

3. The pulse jet engine according to claim 1 in which the following relationships pertain:

$N_L/N_M$ is in the range of about 3.50 to 4.25,
$C_L/C_M$ is in the range of about 1.25 to 1.75, and
$T_L/T_M$ is in the range of about 26.0 to 29.0 where $N_L$ is the length of the nozzle section, $N_M$ is the mean diameter of the nozzle section, $C_L$ is the length of the combustion chamber, $C_M$ is the mean diameter of the combustion chamber, $T_L$ is the length of the tail pipe, and $T_M$ is the mean diameter of the tail pipe.

4. The pulse jet engine according to claim 3 wherein each of said transition sections have half angles of approximately 45°.

5. The pulse jet engine according to claim 4 in which the aforesaid relationships have the following values:

$N_L/N_M$ approximates 3.85, $C_L/C_M$ approximates 1.45, $T_L/T_M$ approximates 27.4, $C_I/N_O$ approximates 2.46, and $C_O T_I$ approximates 3.66 where $C_I$ is the diameter of the combustion chamber at the end thereof adjacent said inlet nozzle section, $N_O$ is the diameter of said inlet nozzle section adjacent said combustion chamber, $C_O$ is the diameter of said combustion chamber adjacent said tail pipe, and $T_I$ is the diameter of said tail pipe adjacent said combustion chamber.

6. The combustion chamber according to claim 2 in which the following relationship pertains: $C_L/C_M$ is in the range of about 1.25 to 1.75 where $C_L$ is the length of the combustion chamber and $C_M$ is the mean diameter thereof.

7. The combustion chamber according to claim 6 in which the aforesaid relationship $C_L/C_M$ approximates 1.45.

References Cited

UNITED STATES PATENTS

| | | | |
|---|---|---|---|
| 2,657,708 | 11/1953 | Kamm | 60—39.77 |
| 2,738,646 | 3/1956 | Kadosch | 60—249 |
| 2,805,545 | 9/1957 | Wilman | 60—39.77 |
| 2,812,635 | 11/1957 | Le Foll | 60—249 |
| 3,035,413 | 5/1962 | Linderoth | 60—249 |

FOREIGN PATENTS 739,729　11/1955　Great Britain.

CARLTON R. CROYLE, Primary Examiner

D. HART, Assistant Examiner

U.S. Cl. X.R.

60—39.76